US008576708B2

(12) United States Patent
Gandhi et al.

(10) Patent No.: US 8,576,708 B2
(45) Date of Patent: Nov. 5, 2013

(54) SYSTEM AND METHOD FOR LINK PROTECTION USING SHARED SRLG ASSOCIATION

(75) Inventors: Rakesh Gandhi, Stittsville (CA); Eric W. Osborne, Sutton, MA (US); Prabhu Vaithilingam, Kanata (CA); Robert Sawaya, Ottawa (CA); Junaid Israr, Kanata (CA)

(73) Assignee: Cisco Technology, Inc., San Jose, CA (US)

( * ) Notice: Subject to any disclaimer, the term of this patent is extended or adjusted under 35 U.S.C. 154(b) by 180 days.

(21) Appl. No.: 13/151,639

(22) Filed: Jun. 2, 2011

(65) Prior Publication Data

US 2012/0307644 A1    Dec. 6, 2012

(51) Int. Cl.
*G06F 11/00*     (2006.01)
*H04J 1/16*      (2006.01)
*H04L 1/00*      (2006.01)

(52) U.S. Cl.
USPC .......................................... 370/228; 370/252

(58) Field of Classification Search
USPC ................... 370/216–228, 252, 353, 401
See application file for complete search history.

(56) References Cited

U.S. PATENT DOCUMENTS

| 7,428,213 | B2* | 9/2008 | Vasseur et al. ............. 370/228 |
| 7,558,218 | B1 | 7/2009 | Swallow |
| 7,701,848 | B2* | 4/2010 | Qiao et al. .................. 370/228 |
| 7,706,284 | B2* | 4/2010 | Suemura ..................... 370/238 |
| 7,885,179 | B1 | 2/2011 | Bryant et al. |
| 2002/0112072 | A1* | 8/2002 | Jain ........................... 709/239 |
| 2005/0031339 | A1* | 2/2005 | Qiao et al. .................. 398/4 |
| 2005/0111349 | A1* | 5/2005 | Vasseur et al. .............. 370/216 |
| 2006/0268679 | A1* | 11/2006 | Deng et al. .................. 370/216 |
| 2007/0211732 | A1* | 9/2007 | Suemura ..................... 370/400 |
| 2010/0241486 | A1* | 9/2010 | Garg et al. .................. 705/10 |

OTHER PUBLICATIONS

Moy, J. "OSPF Version 2," Request for Comments (RFC) 2328, Apr. 1998, 244 pages.
Oran, David, "OSI IS-IS Intra-domain Routing Protocol," Request for Comments (RFC) 1142, Feb. 1990, 157 pages.
Perlman, Radia, *Interconnections Second Edition*, Addison Westley Longmann, Inc., Reading, MA, Sep. 1999, 10 pages.
Pan et al., "Fast Reroute Extensions to RSVP-TE for LSP Tunnels," Request for Comments 4090, May 2005.
Kompella et al., "OSPF Extensions in Support of Generalized Multi-Protocol Label Switching (GMLS)," Request for Comments (RFC) 4203, Oct. 2005.
Kompella et al., "Intermediate System to Intermediate System (IS-IS) Extensions in Support of Generalized Multi-Protocol Label Switching (GMPLS)," Request for Comments (RFC) 4205, Oct. 2005, 11 pages.

(Continued)

*Primary Examiner* — Chuong T Ho
(74) *Attorney, Agent, or Firm* — Novak Druce Connolly Bove + Quigg LLP

(57) ABSTRACT

In one embodiment, certain SRLGs associated with members of a bundle are deemed to be "risk-free SRLGs", i.e., SRLGs whose failure may not substantially impact the capacity of the bundle to carry traffic in a computer network. In a bandwidth unaware embodiment a number of active members of the bundle is identified for each SRLG, and a bandwidth aware embodiment further specifies an available bandwidth capacity for each SRLG to determine risk-free SRLGs. A backup path or tunnel may be established and utilized to protect a communication link as long as the SRLGs shared are deemed to be risk-free SRLGs.

20 Claims, 9 Drawing Sheets

(56) References Cited

OTHER PUBLICATIONS

Sklower, K., "The PPP Multilink Protocol (MP)," Request for Comments (RFC) 1990, Aug. 1996, 24 pages.

"MPLS Traffic Engineering—DiffServ Aware (DS-TE)," Cisco Systems, Inc., San Jose, CA; 2007 http://www.cisco.com/en/US/docs/ios/mpls/configuration/guide/mp_te_diffserv_aw.pdf, 42 pages.

* cited by examiner

530

|     |     |     |     |     |     |
| --- | --- | --- | --- | --- | --- |
| M1: | 10  | 20  | 30  |     |     |
| M2: | 10  | 20  | 40  |     |     |
| M3: | 10  | 20  | 50  |     |     |
| M4: | 10  | 20  | 50  |     |     |
| M5: | 10  | 30  | 60  |     |     |

| VAL | FAILED LINKS | BUNDLE STATE |
| --- | --- | --- |
| 10  | 5   | DOWN |
| 20  | 4   | DOWN |
| 30  | 2   | UP  |
| 40  | 1   | UP  |
| 50  | 2   | UP  |
| 60  | 1   | UP  |

| VAL | ACTIVE BANDWIDTH | BUNDLE STATE |
| --- | --- | --- |
| 10  | 0G  | DOWN |
| 20  | 40G | DOWN |
| 30  | 60G | UP  |
| 40  | 100G | UP  |
| 50  | 60G | UP  |
| 60  | 70G | UP  |

|     |     |     |     |     |
| --- | --- | --- | --- | --- |
| M1: | 10G | 10  | 20  | 30  |
| M2: | 10G | 10  | 20  | 40  |
| M3: | 10G | 10  | 20  | 50  |
| M4: | 40G | 10  | 20  | 50  |
| M5: | 40G | 10  | 30  | 60  |

FIG. 5E

SYSTEM AND METHOD FOR LINK PROTECTION USING SHARED SRLG ASSOCIATION

TECHNICAL FIELD

The present disclosure relates generally to computer networks and, more particularly, to protection of communication links in a computer network with backup paths using Shared Risk Link Group (SRLG) network constraints.

BACKGROUND

In order to protect against failures in a computer network, network devices, such as routers or nodes, may establish backup tunnels over paths that offer an alternative to protected physical or logical network elements (e.g., communication links). It is often desirable, however, to take into account network constraints when establishing a backup tunnel. One such constraint is shared risk link groups (SRLGs), where a communication link and its associated SRLGs may be advertised to the network so that other nodes may utilize such advertisements when calculating paths in the network. For example, when different links share a common resource, such as an optical fiber or the like, they may participate in the same SRLG. Failure of the shared resource (the fiber in this example) may result in the failure of each of the communication links whose traffic is carried in the network using that shared resource.

A group of links or members may be organized and advertised to the network as a single connection or "bundle" for a variety of reasons including, for example, redundancy, load balancing, and/or increasing the available bandwidth between two nodes in the network. Each member of the bundle may be associated with one or more SRLGs, i.e., some SRLGs may belong exclusively to one member, or to a subset of the members in the bundle. These SRLGs may be further advertised to the network in the context of their constituent bundle member associations, e.g., the SRLGs may be advertised as a union of all members of the bundle. When establishing a path for a backup tunnel, a node, such as a point of local repair (PLR), may consider the SRLGs of the link it is trying to protect and, in fact, may calculate a path that is SRLG-diverse from the link being protected. That is, according to a prior implementation, an advertised bundle may be avoided when establishing a backup tunnel if the SRLG(s) associated with the communication link being protected is shared with any of the SRLGs for that bundle. However, such an implementation is inefficient and overly restrictive.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5B illustrates an example SRLG association for each member of the bundle according to one or more bandwidth unaware embodiments described herein;
FIG. 5C illustrates an example repackage of the SRLG association based on a minimum link value according to the bandwidth unaware embodiments;
FIG. 5D illustrates an example repackage of the SRLG association based on a minimum bandwidth threshold according to the bandwidth unaware embodiments;
FIG. 5E illustrates an example SRLG association for each member of the bundle according to one or more bandwidth aware embodiments described herein.

DESCRIPTION OF EXAMPLE EMBODIMENTS

Overview

Figure 1:
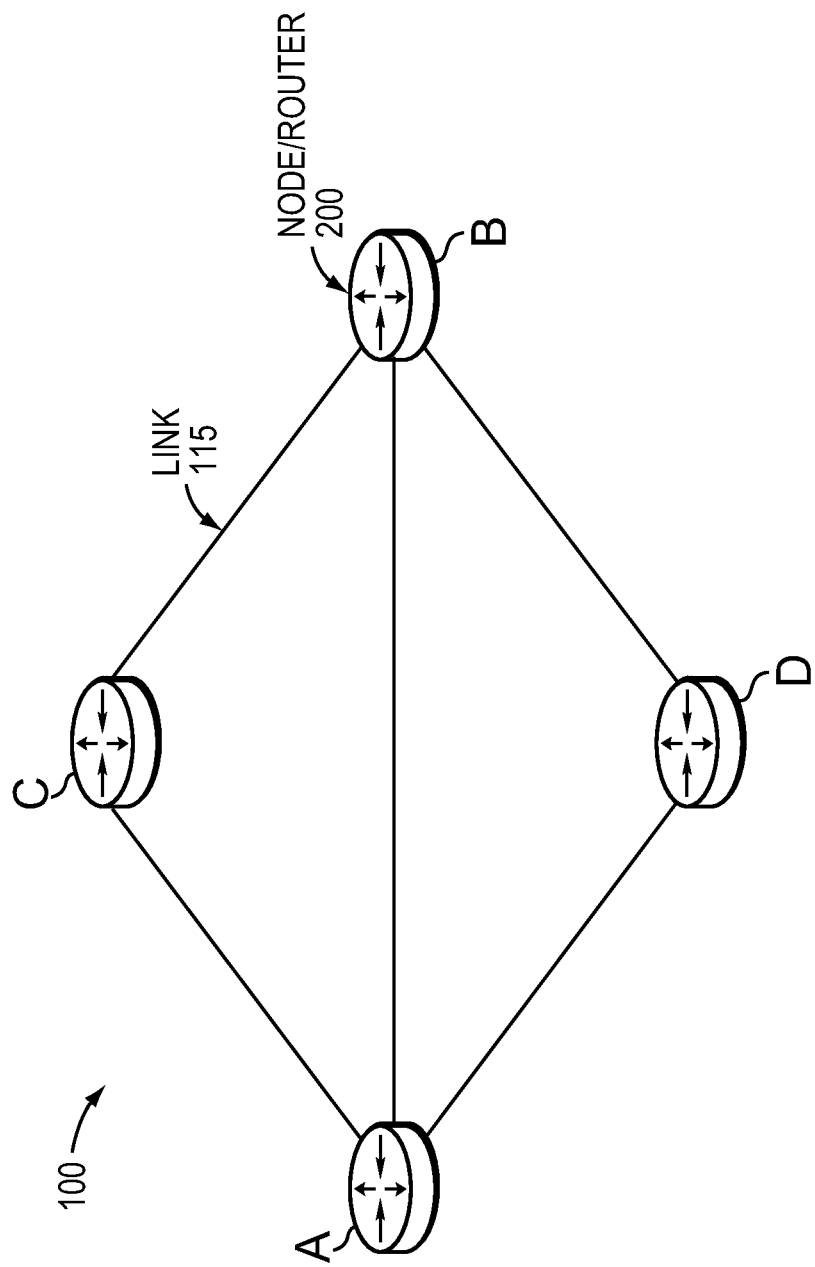
FIG. 1 illustrates an example computer network.

According to one or more embodiments of the disclosure, certain SRLGs associated with members of a bundle are deemed to be "risk-free SRLGs", i.e., SRLGs whose failure may not substantially impact the capacity of the bundle to carry traffic in a computer network. The capacity of the bundle to carry traffic may be determined based on the one or more embodiments disclosed herein, e.g., a bandwidth unaware embodiment that specifies a threshold number of active members of the bundle or a minimum bandwidth threshold of the bundle, and a bandwidth aware embodiment that further specifies an available bandwidth capacity of the bundle. A backup tunnel may then be established over the bundle and utilized to protect a communication link that shares one or more SRLGs with the bundle as long as the SRLGs are deemed to be risk-free SRLGs. Similarly, a backup tunnel may be established over a communication link and utilized to a protect a bundle of member links that share one or more SRLGs with the communication link as long as the SRLGs are deemed to be risk-free SRLGs.

Specifically, according to the bandwidth unaware embodiment, a first network node (e.g., a headend node) for the bundle may advertise to the network each SRLG associated with the bundle along with an indicator indicating whether that SRLG is deemed to be "risk-free" or "risky"; alternatively, the headend node may advertise only those SRLGs that are deemed to be "risky". According to the bandwidth aware embodiment, the headend node may advertise to the network each SRLG associated with the bundle, the indicator indicating whether that SRLG is deemed to be "risk-free" or "risky", and an amount of bandwidth capacity lost from the bundle should that SRLG fail. When calculating a path for the backup tunnel in the network, a second network node, e.g., a PLR, may utilize such advertisements to establish the tunnel over the bundle, thereby protecting the link that shares one or more of the risk-free SRLGs of the bundle.

DESCRIPTION

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS or, more particularly, an area is generally referred to as a "domain."

FIG. 1 illustrates an example computer network 100 illustratively comprising network nodes, such as routers 200 (e.g., routers A-D) interconnected by communication links 115. As used herein, the communication links may be labeled by their corresponding endpoints, such as the link between nodes B and D being referred to herein as "link BD" (or equally "link DB"). Those skilled in the art will understand that any number of nodes, devices and/or links may be used in the computer network, and that the view shown herein is for simplicity. Those skilled in the art will also understand that while the embodiments described herein are described generally, they may apply to any network configuration within an AS or area, or throughout multiple ASes or areas.

Figure 2:
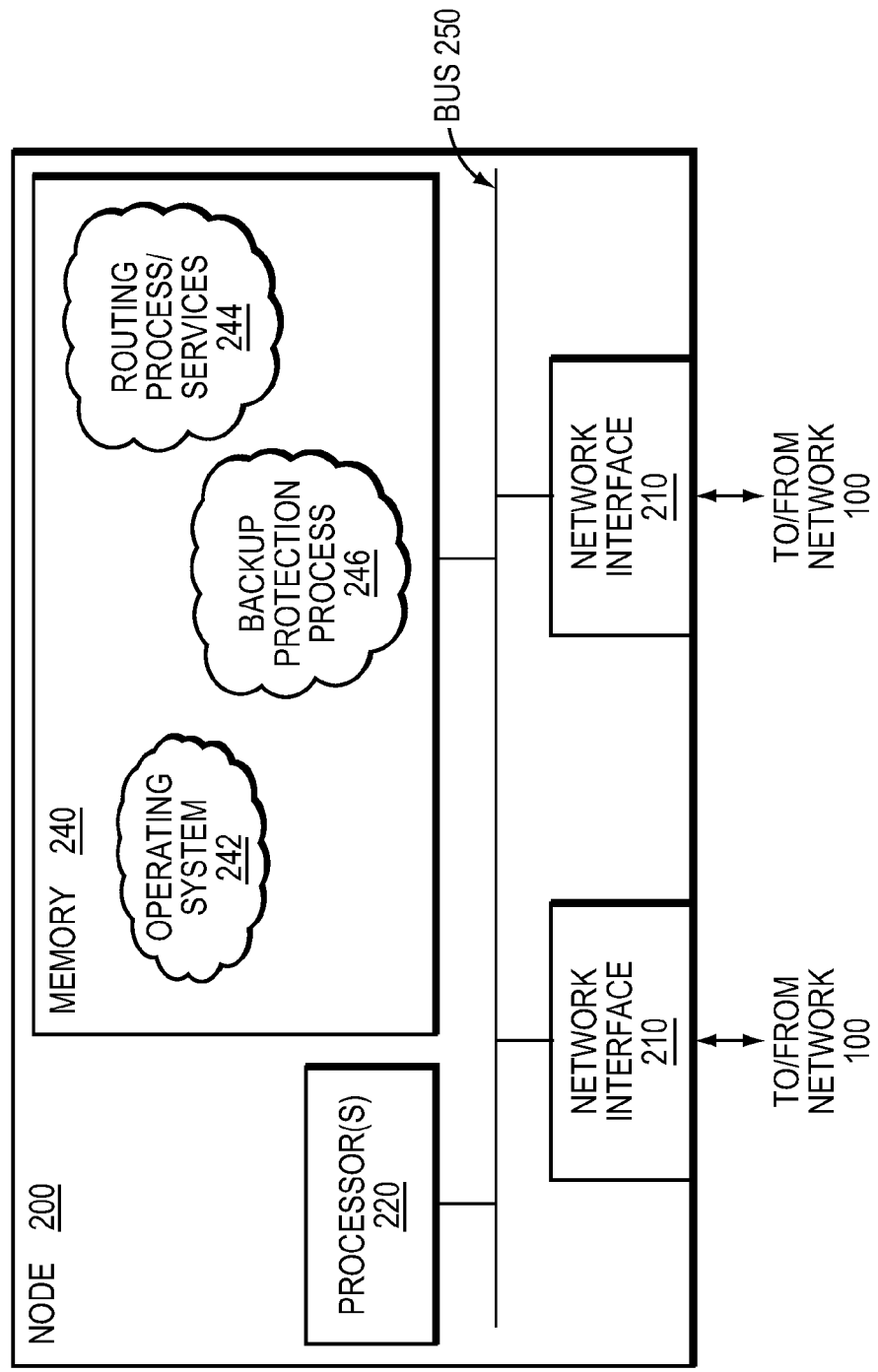
FIG. 2 illustrates an example network node.

FIG. 2 illustrates an example network node 200 that may be used with one or more embodiments described herein. The node may comprise a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art.

The memory 240 comprises a plurality of locations that are addressable by the processor(s) 220 and the network interfaces 210 for storing software programs and data structures associated with the embodiments described herein. The processor 220 may comprise necessary elements or logic adapted to execute the software programs and manipulate the data structures. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the node. These software processes and/or services may comprise routing process/services 244 and backup protection process 246 that may, for example, facilitate signaling and establishment of backup tunnels as described herein. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

Network nodes in an AS or routing area are typically configured to forward data using "interior gateway" routing protocols. These interior gateway protocols (IGP) may define the manner with which routing information and network-topology information are exchanged and processed in the routing area. For instance, IGP protocols typically provide a mechanism for distributing network address information corresponding to a set of nodes and subnetworks that are reachable (i.e., accessible) to intermediate nodes in the routing area. As such, each intermediate node receives a consistent "view" of the routing area's topology. Examples of interior gateway routing protocols may include conventional link-state protocols, such as the Open Shortest Path First (OSPF) protocol and the Intermediate-System-to-Intermediate-System (IS-IS) protocol. The OSPF and IS-IS protocols are well-known and described in more detail in the Internet Engineering Task Force (IETF) publications Request for Comments (RFC) 2328, entitled "OSPF Version 2," dated April 1998 and RFC 1142, entitled "OSI IS-IS Intra-domain Routing Protocol," dated February 1990.

Routing process/services 244 contain computer executable instructions executed by processor 220 to perform functions provided by one or more routing protocols, such as IGP (e.g., OSPF and IS-IS), as will be understood by those skilled in the art. These functions may be configured to manage a forwarding information database (not shown) containing, e.g., data used to make forwarding decisions. In particular, changes in the network topology may be communicated among nodes 200 using routing protocols, such as the conventional OSPF and IS-IS link-state protocols (e.g., to "converge" to an identical view of the network topology). Notably, routing services 244 may also perform functions related to virtual routing protocols, such as maintaining VRF instances (not shown), or tunneling protocols, such as for Multi-Protocol Label Switching (MPLS), each as will be understood by those skilled in the art.

Conventional link-state protocols, such as OSPF and IS-IS, use IGP advertisements for exchanging routing information between interconnected intermediate network nodes (i.e., IGP nodes 200) in a routing area. As used herein, an IGP advertisement describes any message used by an IGP routing protocol to communicate routing information and/or network-topology information among the interconnected IGP nodes. An IGP node typically generates an IGP advertisement in response to a network event, such as a detected node or link failure, and in some cases may generate its IGP advertisements periodically that include topology information. Operationally, a first IGP node may generate an IGP advertisement and then "flood" (i.e., transmit) the advertisement to each of its directly-connected IGP nodes (neighboring IGP nodes) identified in the advertisement. Thereafter, a neighboring IGP node receives the flooded advertisement and updates its local set of routing information based on the contents of the received advertisement. Next, the neighboring IGP node may flood the received IGP advertisement to each of its directly-connected IGP nodes, except for the node which previously flooded the advertisement. This process may be repeated until each IGP node in the routing area has received the advertisement and updated its local routing information.

The IGP advertisement typically contains one or more "cost" values for each of the neighboring nodes identified in the advertisement. As used herein, a cost value associated with a neighboring node is an arbitrary metric used to determine the relative ease/burden of communicating with that node. The cost values may correspond to various parameters and attributes associated with the neighboring node or with the data link coupled to the node. For example, the cost values may indicate, among other things, a relative preference assigned to the neighboring node, the maximum available bandwidth over a data link coupled to the node, a minimum round-trip time required to communicate with the node and/or a relative reliability or quality-of-service metric associated with the node. In practice, the cost values associated with a link or node are manually assigned, e.g., by a system administrator, and are therefore static in the sense that they do not change values over time.

Figure 3:
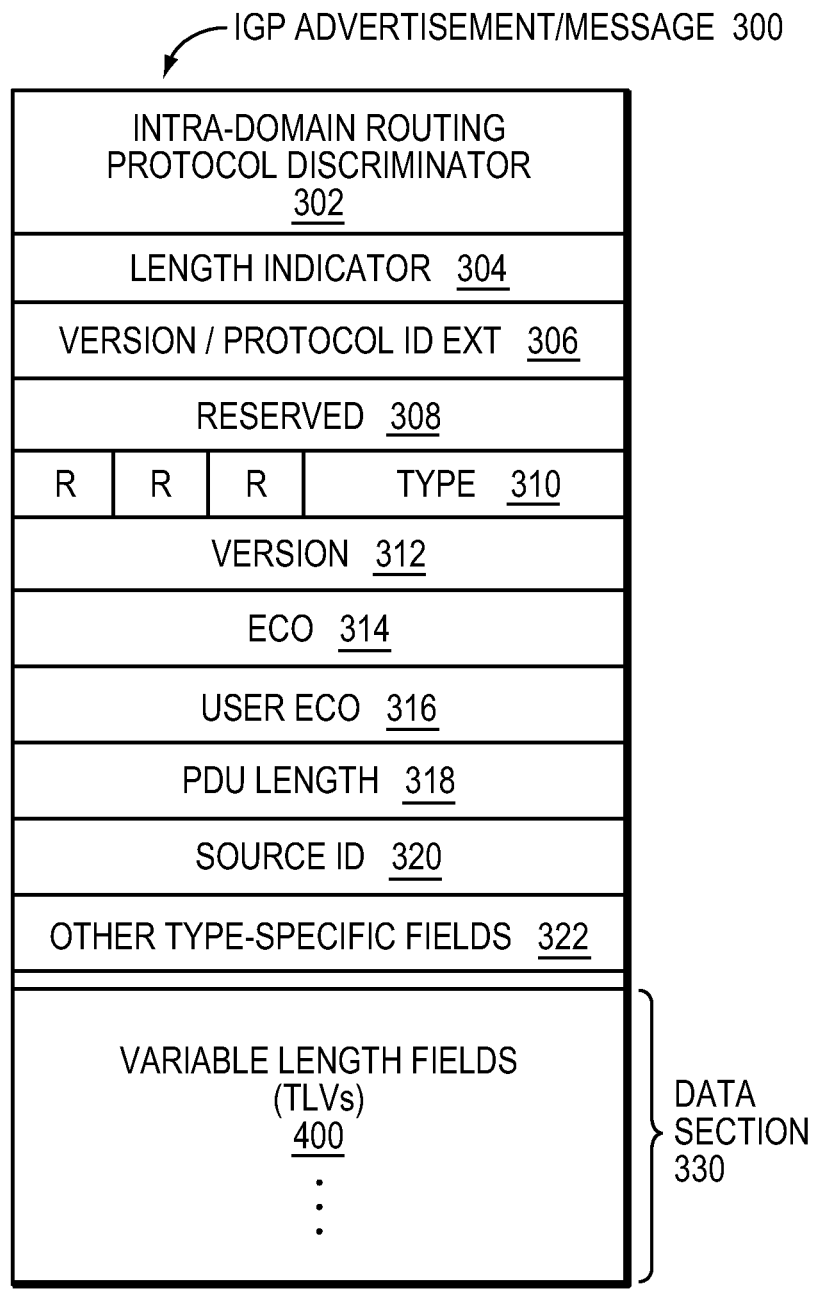
FIG. 3 illustrates an example IGP advertisement.

FIG. 3 illustrates an example IGP advertisement/message 300 illustratively embodied as an IS-IS link state packet. Those skilled in the art will understand, however, that other IGP advertisements, such as, e.g., OSPF link state advertisements, may be used in accordance with the embodiments disclosed herein. The advertisement 300 includes an intra-domain routing protocol discriminator field 302 that stores a value identifying the specific protocol of the message (e.g., IS-IS), and a length indicator field 304 that stores a value indicating the length of the standard header for the advertisement. Also, a version/protocol ID extension (ext) field 306 may be used to further store a value defining the particular version of the protocol. Reserved field 308 and "R" fields are illustratively reserved for future use with the protocol, as are the ECO and User ECO fields 314 and 316. A type field 310 (and corresponding version field 312) stores a value indicating the type (and version) of advertisement 300 being transmitted, which may define the existence of other type-specific fields 322 described below. The PDU length field 318 stores a value indicating the length of the entire PDU (Protocol Data Unit, or advertisement 300). A source ID field 320 stores a value that identifies the node that generated and originally broadcast the advertisement 300. The other type-specific fields 322 may include any number of fields as defined by the protocol, such as checksum fields or maximum area address fields, as understood by those skilled in the art.

Figure 4:
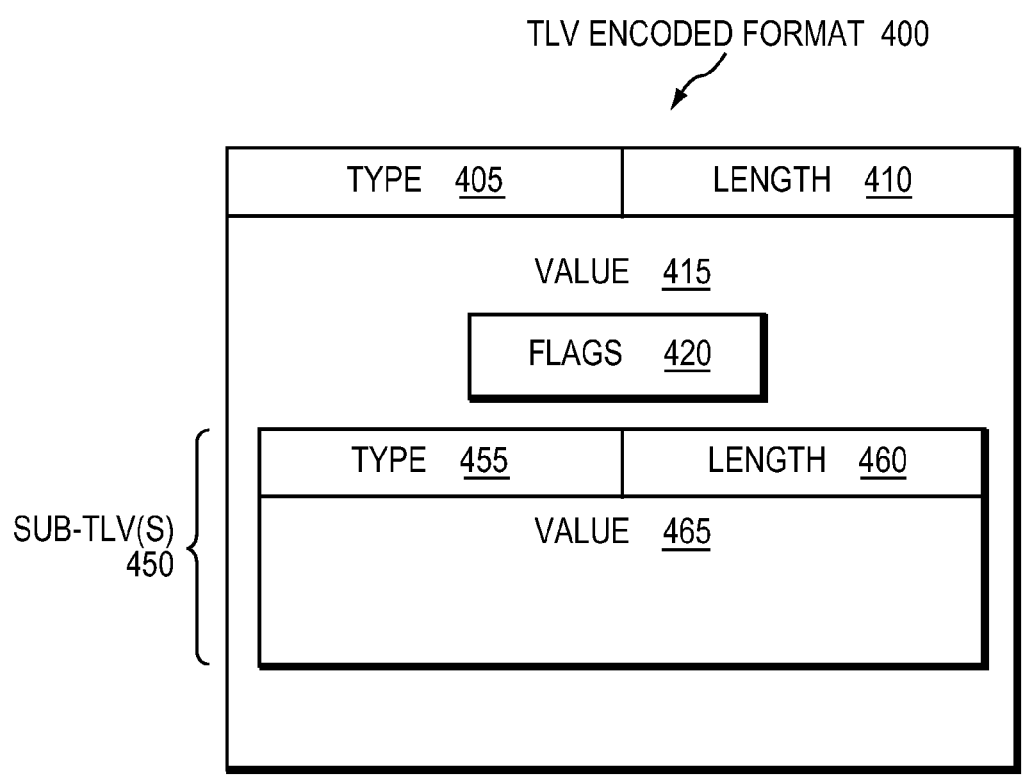
FIG. 4 illustrates an example TLV encoded format that may be advantageously used with the IGP advertisement.

The data section 330 may include one or more variable length fields 400, each of which may have an encoded type (or code), length, and value (TLV) format. FIG. 4 illustrates an example TLV encoded format that may be advantageously used with the IGP advertisement 300. The TLV 400 may be used for a variable length field contained in IGP advertisement 300 or other protocol messages in accordance with the embodiments described herein. To that end, the TLV 400 may be organized to include a Type field 405 containing a predetermined type value indicating the type of information being communicated (conveyed) in the TLV 400, and a Length field 410 indicating the length of information being conveyed. The length (L) parameter contained in the length field is typically implementation-specific and generally denotes the length of a Value (V) field. The value (V) field 415 may contain a value of the actual information conveyed. The TLV encoded format 400 may also comprise one or more non-ordered sub-TLVs 450 carried within the TLV "payload" (e.g. Value field 415), each having a Type field 455, Length field 460, and Value field 465. Notably, other information may be contained within Value field 415 (and/or 465), such as, e.g., one or more flags in Flags field 420.

As noted, IGP advertisements are usually flooded until each IGP node has received an advertisement from each of the other interconnected IGP nodes in the routing area. Furthermore, IGP advertisements are refreshed when a specific timer expires. Then, each of the IGP nodes can construct the same "view" of the network topology by aggregating the received lists of neighboring nodes and cost values. Specifically, each IGP node may input this received routing information to a "shortest path first" (SPF) calculation that determines the lowest-cost network paths that couple the IGP node with each of the other network nodes in the routing area. For example, the Dijkstra algorithm is a conventional technique for performing such a SPF calculation, as described in more detail in Section 12.2.4 of the text book *Interconnections Second Edition*, by Radia Perlman, published September 1999.

An IGP or an MPLS node (e.g., a "point of local repair," PLR) may be configured to "protect" network traffic over a given data link or node by providing a repair path (backup path) that circumvents the protected link or node in the event of certain network failures. For instance, in response to identifying that the protected node or data link has become inaccessible or otherwise inoperative, the node immediately upstream to the failed network element (e.g., link or node) may reroute network traffic normally transiting through the failed network element via the repair path. As such, the IGP or MPLS node does not "drop" received data packets as a result of the network failure. The repair path may be deployed as a fast reroute (FRR) data path, e.g., using MPLS (Traffic Engineering, LDP, etc.) or Internet Protocol (IP) FRR techniques. Examples of MPLS FRR repair paths are described in the RFC 4090, entitled "Fast Reroute Extensions to RSVP-TE for LSP Tunnels," by Pan et al., dated May 2005.

Backup protection process 246 contains computer executable instructions executed by processor 220 to perform functions provided by one or more backup protection protocols, such as MPLS, and according to the techniques (e.g., extensions to conventional protocols) that are described in detail below. Generally, when a node/router operates as a PLR, links of the PLR ("local links") may be protected by creating corresponding backup tunnels or backup paths that typically avoid the protected local links (e.g., and the nodes at the endpoint of the local links for node protection). The backup tunnels may traverse one or more backup links to reach a merge point, which takes traffic diverted onto the backup tunnel and reinserts it into the data stream, having bypassed the failed link (or having detoured around the failed node).

SRLGs are network constraints used by nodes when calculating paths in the network. Illustratively, SRLGs may be used to reflect that failure of a single network element, such as a network node or data link, can result in failures at one or more other network elements. For instance, when different communication links share a common resource, such as an optical fiber or the like, they may participate in the same link-SRLG. Failure of the shared resource (the fiber in this example) would thus result in the failures of each of the links whose data packets are transported using that shared resource. In practice, a link or node may be statically assigned, e.g., by a network administrator, to one or more SRLGs. Additional information on SRLGs is provided in RFC 4203, entitled "OSPF Extensions in Support of Generalized Multi-Protocol Label Switching (GMPLS)," by Kompella et al., dated October 2005 and RFC 4205, entitled "Intermediate System to Intermediate System (IS-IS) Extensions in Support of Generalized Multi-Protocol Label Switching (GMPLS)," by Kompella et al., dated October 2005.

A group of links or members may be organized and advertised to the network as a single connection or "bundle." Each member of the bundle may be associated with one or more SRLGs, i.e., some SRLGs may belong exclusively to one member or to a subset of the members in the bundle. These SRLGs may be further advertised to the network in the context of their constituent bundle member associations, e.g., the SRLGs may be advertised as a union of all members of the bundle. Various forms of link bundles include link bonding/aggregation, EtherChannel, and multilink point-to-point protocol (PPP), which is described in RFC 1990, entitled *The PPP Multilink Protocol (MP)*, published August 1996. Other examples of link bundles will be understood by those skilled in the art, and those mentioned herein are merely examples. For instance, links of VLANs (Virtual LANs, or a group of network nodes/elements on different physical LAN segments operating as though they were on the same physical LAN segment) may also be bundled.

A constraint-based SPF (CSPF) algorithm is often used for calculating local repair paths in a routing area. The CSPF algorithm employs conventional SPF calculations subject to a predetermined set of constraints. Broadly stated, the algorithm "prunes" the network topology information input to the SPF calculations so as to remove any links and/or nodes that do not satisfy the set of constraints. First, the algorithm typically removes the link or node being protected to ensure that the calculated repair path will not include the protected link or node. In conventional techniques, in the case of a protected communication link, any other links that are members of a bundle and share the same SRLGs as the protected link are also removed. After removing such ineligible links and nodes, the resultant constrained network topology is input to the CSPF calculations. The result of the CSPF calculations is a constrained shortest path that may be used to select a lowest-cost local repair path for the protected node or link. However, such an implementation is inefficient and overly restrictive because a given bundle may contain an SRLG that does not need to be avoided even though the SRLG is also associated with the protected link.

Link Protection Using Shared SRLG Association

According to one or more embodiments of the disclosure, certain SRLGs associated with members of a bundle are deemed to be "risk-free SRLGs", i.e., SRLGs whose failure may not substantially impact the capacity of the bundle to carry traffic in the computer network. The capacity of the bundle to carry traffic may be determined based on the one or more embodiments disclosed herein, e.g., a bandwidth unaware embodiment that specifies a threshold number of active members of the bundle or a minimum bandwidth threshold of the bundle, and a bandwidth aware embodiment that further specifies an available bandwidth capacity of the bundle. A backup tunnel may then be established over the bundle and utilized to protect a communication link that shares one or more SRLGs with the bundle as long as the SRLGs are deemed to be risk-free SRLGs. Similarly, a backup tunnel may be established over a communication link and utilized to a protect a bundle of member links that share one or more SRLGs with the communication link as long as the SRLGs are deemed to be risk-free SRLGs.

Specifically, according to the bandwidth unaware embodiment, a first network node (e.g., a headend node) for the bundle may advertise to the network each SRLG associated with the bundle along with an indicator indicating whether that SRLG is deemed to be "risk-free" or "risky"; alternatively, the headend node may advertise only those SRLGs that are deemed to be "risky". According to the bandwidth aware embodiment, the headend node may advertise to the network each SRLG associated with the bundle, the indicator indicating whether that SRLG is deemed to be "risk-free" or "risky", and an amount of bandwidth capacity lost from the bundle should that SRLG fail. When calculating a path for the backup tunnel in the network, a second network node, e.g., a PLR, may utilize such advertisements to establish the tunnel over the bundle, thereby protecting the link that shares one or more of the risk-free SRLGs of the bundle.

Bandwidth Unaware Embodiments

Figure 5A:
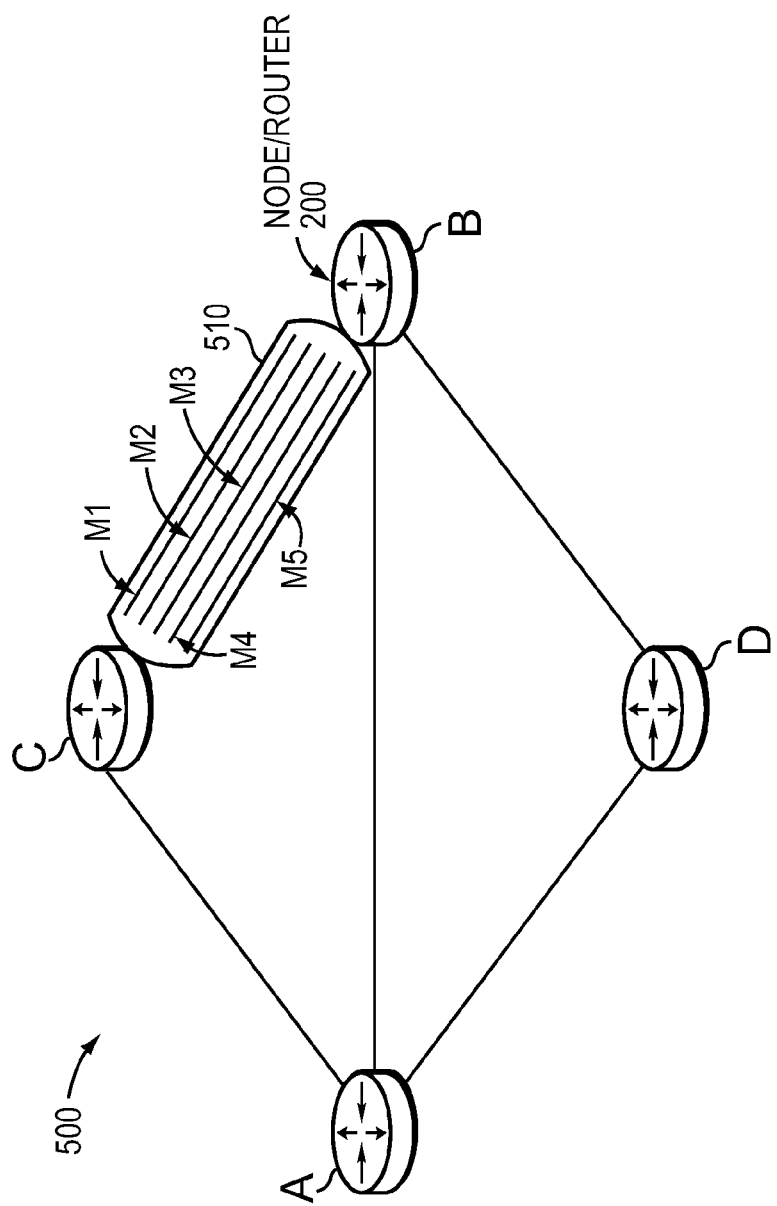
FIG. 5A illustrates an example computer network having a bundle.

FIG. 5A illustrates an example computer network having a bundle. In an illustrative embodiment, the computer network 500 comprises a plurality of nodes/routers 200 (e.g., routers A-D) interconnected by communication links (e.g., link AB, link AC, link AD, and link DB), each of which may belong to particular SRLGs (e.g., 10, 20, 30, 40, 50, 60), and wherein other communication links may be grouped together to form a bundle 510, such as bundle CB. Bundle 510, in this case, may include members (e.g., links) M1, M2, M3, M4, and M5, as shown. According to one or more embodiments disclosed herein, the bandwidth unaware embodiments specify a threshold number of active members of the bundle. That is, the bandwidth unaware embodiments specify that the bundle may be configured (e.g., by a system administrator) with a threshold number of active members (i.e., a minimum-links value) which, for an illustrative example, may be two (2). Notably, the minimum-links value of two denotes that any two members of M1-M5 must be active (e.g., operational) or in an "up" state in order for the bundle 510 to be active and assume an "up" state. Thus, if any three (3) of M1-M5 may become inactive (e.g., fail) and assume a "down" state, the bundle will maintain the "up" state. However, if any four (4) of M1-M5 may become inactive, the bundle 510 will also become inactive and assume the "down" state. It is noted that the minimum-links value of two is exemplary and other values may be configured for the bundle.

According to one or more alternative embodiments disclosed herein, the bandwidth unaware embodiments may alternatively specify a minimum bandwidth threshold of the bundle. That is, the bandwidth unaware embodiments may specify that the bundle may be configured (e.g., by a system administrator) with a minimum amount of bandwidth which, for an illustrative example, may be 60G. Notably, the minimum bandwidth threshold of 60G denotes that at least 60G must be active on any bundle members M1-M5 for the bundle 510 to be active and assume an "up" state. Thus, if any members of M1-M5 become inactive (e.g., fail) and assume a "down" state, the bundle will be in the "up" state if the remaining bandwidth (e.g., active bandwidth) on the active members of M1-M5 is at least 60G. However, if any members M1-M5 become inactive (e.g., fail), the bundle 510 will be in the "down" state if the remaining bandwidth (e.g., active bandwidth) of the active members is less than 60 G. It is noted that the minimum bandwidth threshold of 60G is exemplary and other minimum bandwidth thresholds may be configured for the bundle.

As described herein, a node 200 (e.g., a headend node) for the bundle may advertise to the network each SRLG associated with the bundle 510 along with an indicator indicating whether that SRLG is deemed to be "risk-free" or "risky." FIG. 5B illustrates an example SRLG association 530 for each member of the bundle 510 according to the bandwidth unaware embodiments disclosed herein. In an illustrative embodiment, the bundle members M1-M5 have the following SRLG associations:

M1 is associated with SRLGs 10, 20, 30;
M2 is associated with SRLGs 10, 20, 40;
M3 is associated with SRLGs 10, 20, 50;
M4 is associated with SRLGs 10, 20, 50;
M5 is associated with SRLGs 10, 30 60.

The SRLG association 530 may be utilized in conjunction with the minimum-links value (e.g., two) to determine if the failure or inactivity of a particular SRLG may cause the bundle 510 to assume the "down" state (and thus constitute a "risky" SRLG) or may allow the bundle to assume the "up" state (and thus constitute a "risk-free" or "non-risky" SRLG). FIG. 5C illustrates an example repackage 540 of the SRLG association based on a minimum link value according to the bandwidth unaware embodiments. In an illustrative embodiment, the repackage 540 indicates a value for each SRLG (Val), a number of links that fail when an SRLG fails (FailedLinks) and a resultant bundle state (BundleState). For example, if SRLG 10 fails or otherwise becomes inactive ("down"), then all member links (e.g., M1-M5) of the bundle become inactive because SRLG 10 is associated with each member M1-M5. Furthermore, since the inactivity of five (5) members does not satisfy the minimum-links value of two (2), the resulting bundle state is "down." Similarly, if SRLG 20 becomes inactive ("down"), then members M1-M4 become inactive, and only M5 remains active ("up"). Since the failure of SRLG 20 does not allow for at least two members of the bundle to remain active, the overall bundle state is "down".

However, if SRLG 30 becomes inactive ("down"), then only members M1 and M5 become inactive, and thus three members (e.g., M2-M4) remain active ("up") and the bundle maintains the "up" state because the minimum-links value of two is satisfied. Further, if SRLG 40 becomes inactive ("down"), then only member M2 becomes inactive, and thus four members (e.g., M1 and M3-M5) remain active ("up") and the bundle maintains the "up" state because the minimum-links value of two is satisfied. Similarly, if SRLG 50 becomes inactive ("down"), then only members M3 and M4 become inactive, three members (e.g., M1, M2, and M5) remain active and the resulting bundle state is "up." Finally, if SRLG 60 becomes inactive ("down"), then only M5 becomes inactive, four members (e.g., M1-M4) remain active and the resulting bundle state is "up." Thus, the "risky" SRLGs in this example, i.e., those SRLGs whose failure causes the bundle to assume the "down" state, are SRLG 10 and SRLG 20. That is, the minimum-links value (e.g., two) can not satisfy the threshold number of active members needed for the bundle to assume the "up" state if either SRLG 10 or SRLG 20 fails or otherwise becomes inactive. Conversely, the failure or inactivity of SRLG 30, SRLG 40, SRLG 50, or SRLG 60 will not cause the bundle to assume the "down" state, since at least two members (e.g., the minimum-links value) are operational. Therefore, according to the example bandwidth unaware embodiment, the set of "risky" SRLGs are SRLG 10 and SRLG 20, and the set of "non-risky" SRLGs are SRLG 30, SRLG 40, SRLG 50, and SRLG 60.

Alternatively, the SRLG association 530 may be utilized in conjunction with the minimum bandwidth threshold of the bundle to determine if the failure or inactivity of a particular SRLG may cause the bundle 510 to assume the "down" state (and thus constitute a "risky" SRLG) or may allow the bundle to assume the "up" state (and thus constitute a "risk-free" or "non-risky" SRLG). Assume the bandwidth capacity for M1 is 10G, M2 is 10G, M3 is 10G, M4 is 40G, and M5 is 40G for a total bundle capacity of 110G (10G+10G+10G+40G+40G=110G). FIG. 5D illustrates an example repackage 550 of the SRLG association based on a minimum bandwidth threshold according to the bandwidth unaware embodiments. In an illustrative embodiment, the repackage 550 indicates a value for each SRLG (Val), an amount of active bandwidth associated with the bundle when an SRLG fails (Active bandwidth) and a resultant bundle state (BundleState). For example, if SRLG 10 fails or otherwise becomes inactive ("down"), then the active bandwidth capacity associated with the bundle is 0G since all member links (e.g., M1-M5) of the bundle become inactive. Furthermore, since the active bandwidth capacity associated with the bundle of 0G does not satisfy the minimum bandwidth threshold of 60G, the resulting bundle state is "down." Similarly, if SRLG 20 becomes inactive ("down"), then members M1-M4 become inactive, and only M5, with a bandwidth capacity of 40G, remains active ("up"). Since the active bandwidth capacity associated with the bundle of 40G does not satisfy the minimum bandwidth threshold of 60G, the resulting bundle state is "down."

However, if SRLG 30 becomes inactive ("down"), then members M1 and M5 become inactive, and thus three members (e.g., M2-M4) remain active ("up"). The bandwidths associated with members M2-M4 are 10G, 10G, and 40G respectively, and thus the active bandwidth capacity associated with the bundle is 60G. Since the active bandwidth capacity associated with the bundle of 60G satisfies the minimum bandwidth threshold of 60G, the resulting bundle state is "up." Further, if SRLG 40 becomes inactive ("down"), then only member M2 becomes inactive, and thus four members (e.g., M1 and M3-M5) remain active ("up"). The bandwidths associated with members M1 and M3-M5 are 10G, 10G, 40G, and 40G respectively, and thus the active bandwidth capacity associated with the bundle is 100G. Since the active bandwidth capacity associated with the bundle of 100G satisfies the minimum bandwidth threshold of 60G, the resulting bundle state is "up." Similarly, if SRLG 50 becomes inactive ("down"), then only members M3 and M4 become inactive, and three members (e.g., M1, M2, and M5) remain active ("up"). The bandwidths associated with members M1, M2, and M5 are 10G, 10G, and 40G respectively, and thus the active bandwidth capacity associated with the bundle is 60G. Since the active bandwidth capacity associated with the bundle of 60G satisfies the minimum bandwidth threshold of 60G, the resulting bundle state is "up." Finally, if SRLG 60 becomes inactive ("down"), then only M5 becomes inactive, and four members (e.g., M1-M4) remain active ("up"). The bandwidths associated with members M1-M4 are 10G, 10G, 10G, and 40G respectively, and thus the active bandwidth capacity associated with the bundle is 70G. Since the active bandwidth capacity associated with the bundle of 70G satisfies the minimum bandwidth threshold of 60G, the resulting bundle state is "up." Therefore, and similar to the example that utilized the SRLG association 530 in conjunction with the minimum-links value (e.g., two), the set of "risky" SRLGs are SRLG 10 and SRLG 20, and the set of "non-risky" SRLGs are SRLG 30, SRLG 40, SRLG 50, and SRLG 60.

According to a first method of advertising SRLGs for the bandwidth unaware embodiments described herein, the headend node of the bundle, e.g., router C, may organize the SRLG association 530 and its repackage 540 or repackage 550, described above, as a data structure, e.g., a 2-part tuple, with the first part identifying each SRLG and the second part (e.g., a bit) indicating whether the SRLG is "non-risky" or "risky." Illustratively, the 2-part SRLG association for bundle CB may be embodied as:

[(10,1), (20,1), (30,0), (40,0), (50,0), (60,0)]

wherein a bit value of "0" may indicate that an associated SRLG is "non-risky", while a bit value of "1" may indicate that the SRLG is "risky." It should be noted that the use of a bit (having two values) is simply exemplary and other indicators and/or values may be used. The headend node C may thereafter load the 2-part tuple in, e.g., IGP advertisement 300, and flood (advertise) the SRLG association for bundle CB throughout the network using, e.g., the TLV format 400 described above.

According to a second, alternative method of advertising SRLGs for the bandwidth unaware embodiments, the headend node may advertise only those SRLGs of bundle CB which are deemed "risky". In other words, and with reference to the example above, headend node C would only flood SRLG 10 and SRLG 20 (expressed, e.g., as [10, 20]) using, again, the TLV format 400 of IGP advertisement 300. The second method represents an illustrative extension to a conventional SRLG flooding mechanism that provides a system administrator with less information about the actual state of the network, but that is backward-compatible with the conventional mechanism.

Operationally, assume that a PLR (for example, node A) wishes to protect communication link AB in network 500. Assume further that the link AB is associated with SRLG 30 and SRLG 70. Prior implementations would have been restricted with regards to protecting link AB with a backup tunnel that includes (i.e., crosses) at least one member link of bundle CB because SRLG 30 is associated with both the link AB and bundle CB. However, the bandwidth unaware embodiments described herein overcome such restrictions. Specifically, upon receiving the advertisement 300 containing the SRLG association of bundle CB as transmitted by the headend node C, node A may learn (become aware of) those SRLGs that are "non-risky" and "risky" for bundle CB. As a result, node A may determine that SRLG 30 is a "non-risky" SRLG (e.g., the failure or inactivity of SRLG 30 may not substantially impact the capacity of the bundle 510 to carry traffic in the computer network 500) and, thus, may protect link AB with a backup tunnel over bundle CB despite the fact that the protected link AB shares SRLG 30 with bundle CB. According to one or more embodiments described herein, node A may utilize a backup tunnel over bundle CB to protect link AB because none of the SRLGs associated with the protected link AB (e.g., SRLG 30 and SRLG 70) are in the "risky" subset (e.g., SRLG 10 and SRLG 20) of bundle CB. Conversely, if link AB is associated with SRLG 20, then node A may not protect that link with a backup tunnel over bundle CB because SRLG 20 is in the "risky" subset (e.g., SRLG 10 and SRLG 20) of bundle CB.

Similarly, the PLR (for example, node A) may wish to protect bundle CB in network 500. Assuming the same SRLG association for bundle CB and communication link AB as described above, node A may utilize a backup tunnel over communication link AB to protect bundle CB because none of the SRLGs shared amongst the bundle CB and the communication link AB (e.g., SRLG 30) are in the "risky" subset (e.g., SRLG 10 and SRLG 20) of the bundle. Conversely, if link AB is associated with SRLG 20, then node A may not protect the bundle CB with a backup tunnel over communication link AB because SRLG 20 is in the "risky" subset (e.g., SRLG 10 and SRLG 20) of bundle CB.

Bandwidth Aware Embodiments

In addition to specifying a threshold number of active members of the bundle 510 or a minimum bandwidth threshold associated with the bundle 510, the bandwidth aware embodiments further specify an available bandwidth capacity of the bundle. As an example, assume that bundle CB includes members M1-M5 and their associated SRLGs, as described above. Further, assume that a bandwidth capacity is provided for each member, as described above. Specifically, the bandwidth capacity for M1 is 10G, M2 is 10G, M3 is 10G, M4 is 40G, and M5 is 40G for a total bundle capacity of 110G (10G+10G+10G+40G+40G=110G). FIG. 5E illustrates an example SRLG association 560 for each member of the bundle 510 according to the bandwidth aware embodiments described herein. Note that the SRLG association 550 combines the SRLG information (described above with respect to FIG. 5B) with the bandwidth capacity for each member M1-M5.

According to a method of advertising SRLGs for the bandwidth aware embodiments, the headend node of the bundle, e.g., router C, may organize the SRLG association 560 as a 3-part tuple, with the first part identifying each SRLG, the second part (e.g., a bit) indicating whether the SRLG is "non-risky" or "risky" and the third part indicating an amount of bandwidth capacity lost to the bundle should a particular SRLG fail or otherwise become inactive. Illustratively, the 3-part SRLG association for bundle CB may be embodied as:

[(10, 1, n/a), (20, 1, n/a), (30, 0, 50G), (40, 0, 10G), (50, 0, 50G), (60, 0, 40G)]

wherein a bit value of "0" may indicate that an associated SRLG is "non-risky", while a bit value of "1" may indicate that the SRLG is "risky." The headend node may thereafter load the 3-part tuple in, e.g., IGP advertisement 300, and flood (advertise) the SRLG association for bundle CB throughout the network using, e.g., the TLV format 400 described above.

Note that in the case of the "risky" SRLGs, the total bandwidth lost may be n/a or a particular value that denotes that the entire bundle 510 assumes the "down" state if the particular SRLG becomes inactive. Thus, for SRLG 10, the advertisement may include a value of "1" indicating that SRLG is "risky" and "n/a" for the capacity lost. Similarly, for SRLG 20, the advertisement may include a value of "1" indicating that SRLG is "risky" and "n/a" for the capacity lost. However, for SRLG 30, the advertisement may include a value of "0" indicating that SRLG 30 is "non-risky" and "50G" indicating the amount of bandwidth capacity (e.g., 50G) that would be lost to the bundle if SRLG 30 becomes inactive. Specifically, if SRLG 30 fails or otherwise becomes inactive ("down"), then members M1 and M5 become inactive. In this example, M1 has a bandwidth capacity of 10G and M5 has a bandwidth capacity of 40G; thus, the capacity lost if SRLG 30 becomes inactive is 50G (i.e., 10G+40G). For SRLG 40, the advertisement may include a value of "0" indicating that SRLG 40 is "non-risky", and "10G" indicating that 10G of bandwidth capacity would be lost if SRLG 40 becomes inactive (e.g., M2 becomes inactive and the bundle would lose 10G of bandwidth). Similarly, for SRLG 50, the advertisement may include a value of "0" indicating that SRLG 50 is "non-risky", and "50G" indicating that 50G of bandwidth capacity would be lost if SRLG 50 becomes inactive (e.g., M3 and M4 become inactive and the bundle would lose 10G and 40G of bandwidth). Finally, for SRLG 60, the advertisement may include a value of "0" indicating that SRLG 60 is "non-risky", and "40G" indicating that 40G of bandwidth capacity would be lost if SRLG 60 becomes inactive (e.g., M5 becomes inactive and the bundle would lose 10G of bandwidth).

Once again, assume that the PLR (e.g., node A) wishes to protect communication link AB in network 500. Assume also that link AB is a 10G link having an associated SRLG set [50, 60]. Node A may use the 3-part SRLG association contained in advertisement 300 to determine whether to place a backup up tunnel over bundle CB. According to the one or more bandwidth aware embodiments described herein, node A may determine that it is possible to place the backup tunnel over bundle CB because a failure or other inactivity of SRLG 50 or SRLG 60 will result in bundle CB both maintaining an "up" state and having greater than 10G of backup (remaining) bandwidth capacity to protect link AB. Specifically, if SRLG 50 becomes inactive, the bundle will remain in an "up" state and have a capacity of 60G, i.e., 110G-50G where 110G is the total bundle capacity and 50G is the amount of bandwidth capacity lost if SRLG 50 becomes inactive. Conversely, if link AB has a bandwidth capacity of 90G and SRLG 50 becomes inactive, the bundle will remain in an "up" state, but will only have a remaining bandwidth capacity of 60G, which is insufficient to accommodate, i.e., protect, link AB.

Similarly, the PLR (for example, node A) may protect bundle CB over link AB, if bundle CB and link AB share a non-risky SRLG and the remaining bandwidth capacity on communication link AB is sufficient to accommodate, i.e., protect, bundle CB.

The bandwidth-aware embodiments disclosed herein may be further enhanced with Differentiated Services Aware MPLS Traffic Engineering (DS-TE), a description of which is provided in "MPLS Traffic Engineering—DiffServ Aware (DS-TE)," Cisco Systems, Inc., San Jose, Calif.; 2007. Broadly stated, DS-TE may be employed to divide the bandwidth of a link in a network into pools, for example, a global pool (e.g., utilized for best effort traffic in the network) and a sub-pool or set of sub-pools (e.g., utilized for guaranteed service traffic in the network). The bandwidth allocated to the sub-pool(s) associated with the link may be based upon the amount of bandwidth corresponding to the non-risky SRLGs of that link. Backup tunnels or paths using the sub-pool bandwidth may then be used in conjunction with MPLS Quality of Service (QoS) mechanisms to deliver guaranteed bandwidth services end-to-end across the network. For example, assume that link AB has 40G of risky SRLGs and 20G of non-risky SRLGs. The DS-TE employed sub-pool(s) for link AB may be utilized for guaranteed service traffic, i.e., that is the sub-pool(s) for link AB may be configured with 20G of non-preemptable bandwidth and in accordance with the amount of bandwidth associated with the non-risky SRLGs. Thus, if a risky SRLG fails, tunnels using the non-risky sub-pools(s) would not be "bumped" (preempted).

Figure 6:
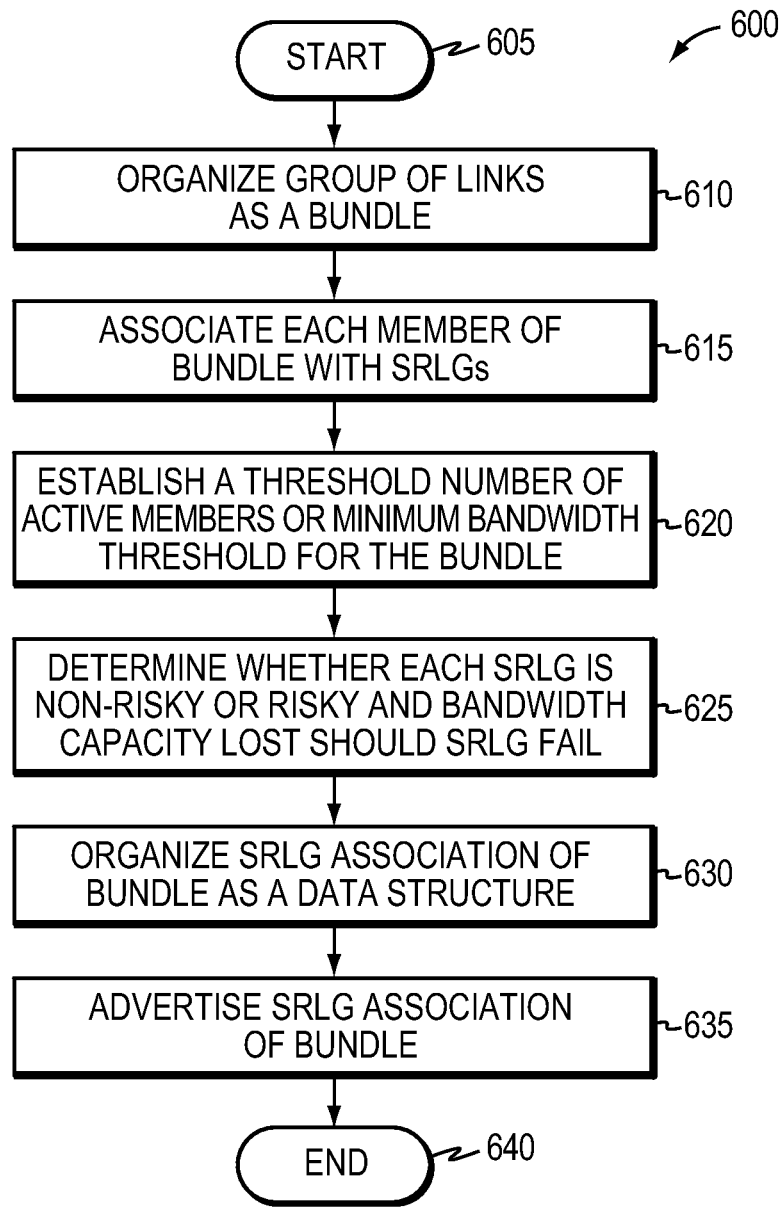
FIG. 6 illustrates an example simplified procedure for advertising SRLGs associated with members of the bundle in accordance with one or more embodiments described herein.

FIG. 6 illustrates an example simplified procedure for advertising SRLGs associated with members of a bundle in accordance with one or more embodiments described herein. The procedure 600 starts at step 605 and continues to step 610, where a group of communication links (members) of a computer network may be organized as a bundle. In step 615, each member of the bundle may be associated with one or more SRLGs. In step 620, a threshold number of active members (i.e., a minimum-links value) or a minimum bandwidth threshold is established for the bundle, wherein the minimum-links value denotes the number of members that must be active for the bundle to be active (i.e., assume an "up" state) and wherein the minimum bandwidth threshold denotes an amount of bandwidth that must be active for the bundle to be active (i.e., assume an "up" state.) In step 625, a determination is made as to whether each SRLG associated with the members of the bundle is "non-risky" or "risky" and the bandwidth capacity that may be lost in the event that the SRLG fails. Specifically, if a particular SRLG fails or otherwise becomes inactive and the number of members in the bundle that remain active is equal to or greater than the minimum-links value, then the particular SRLG is determined to be "non-risky". However, if the number of members in the bundle that remain active is less than the minimum-links value, then the particular SRLG is determined to be "risky". In an alternative embodiment, if a particular SRLG fails or otherwise becomes inactive and the amount of active bandwidth associated with the bundle is greater than or equal to the minimum bandwidth threshold, then the particular SRLG is determined be "non-risky". However, if the amount of active bandwidth associated with the bundle is less than the minimum bandwidth threshold, then the particular SRLG is determined to be "risky". At step 630, the SRLG association of the bundle is organized as a data structure (e.g., a multi-part tuple) within a message (e.g., an advertisement) and, in step 635, the advertisement is flooded (advertised) by a headend node throughout the computer network. For example, and in accordance with the bandwidth unaware embodiments, such a tuple within the advertisement may include an identifier associated with each SRLG indicating whether the SRLG is "non-risky" or "risky". In one or more alternative bandwidth unaware embodiments, the tuple may only include an identifier associated with those SRLGs that are determined to be "risky". In accordance with the bandwidth aware embodiments, in addition to advertising an identifier associated with each SRLG indicating whether the SRLG is "non-risky" or "risky", the tuple may also include the amount of bandwidth lost for each SRLG should that SRLG fail. The procedure then ends at step 640.

Figure 7:
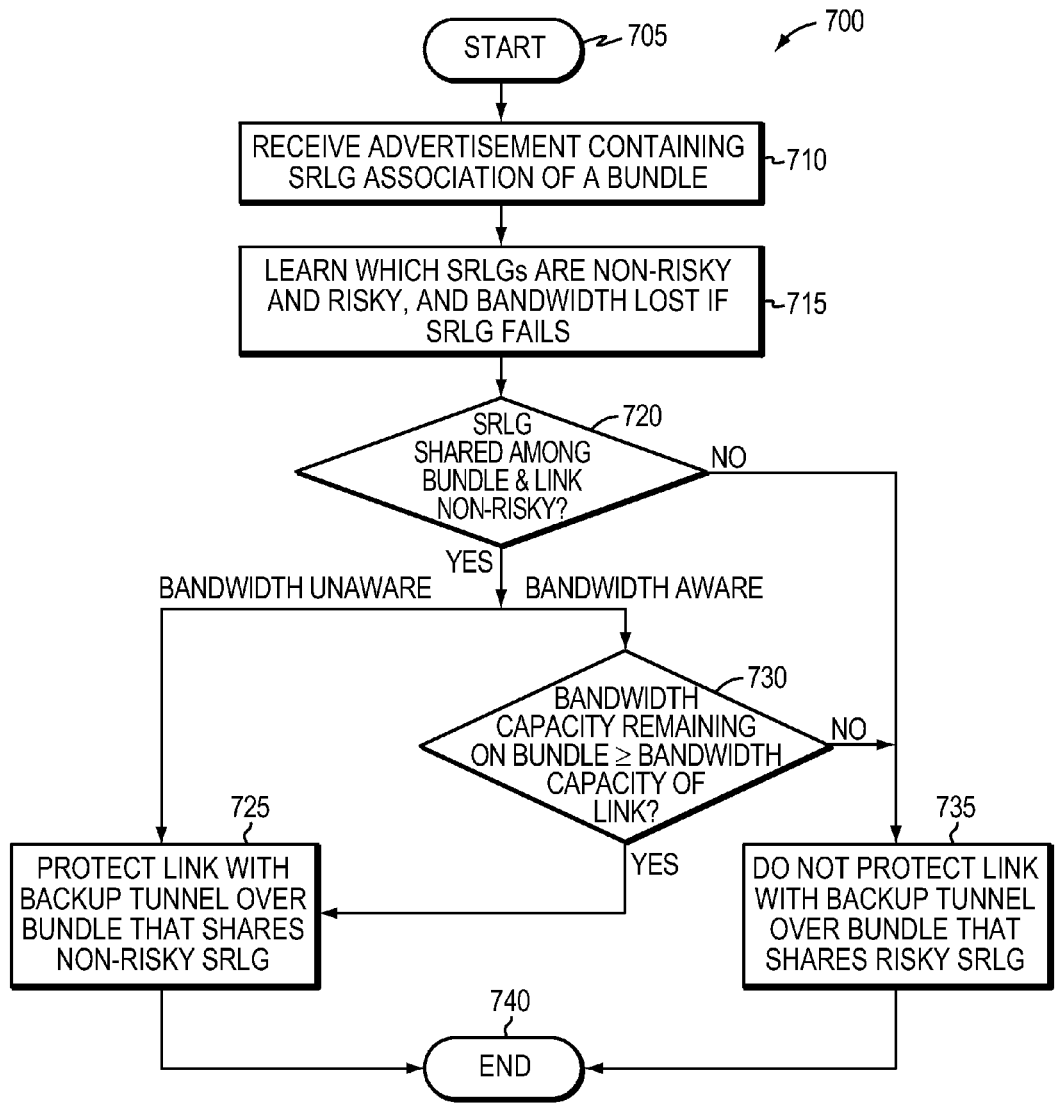
FIG. 7 illustrates an example simplified procedure for protecting a communication link with a backup tunnel over a bundle, where the link and bundle share a SRLG.

FIG. 7 illustrates an example simplified procedure for protecting a communication link with a backup tunnel over a bundle, where the link and bundle share a SRLG. The procedure 700 starts at step 705 and continues to step 710, where a PLR may receive an advertisement containing a SRLG association of a bundle from the network. In step 715, the PLR may analyze the SRLG association to learn which SRLGs are considered "non-risky" and "risky." In addition, the PLR may analyze the association to learn the bandwidth capacity lost if a SRLG of the bundle were to fail or otherwise become inactive. At step 720, the PLR determines whether a SRLG shared amongst the link and the bundle is "non-risky" or "risky." In accordance with the bandwidth unaware embodiments, if the shared SRLG is determined to be a "non-risky" SRLG, then at step 725, the PLR may protect the link with a backup tunnel over the bundle that shares the non-risky SRLG. In accordance with the bandwidth aware embodiments, if the shared SRLG is determined to be a "non-risky" SRLG, then at step 730, the PLR determines whether the bandwidth capacity on the bundle (e.g., total bundle capacity minus the bandwidth capacity lost due to the SRLG failure) is greater than or equal to the bandwidth capacity of the link. If so, the PLR may protect the link with the backup tunnel over the bundle in step 725. However, if the shared SRLG is determined to be a "risky" SRLG (step 720) or if the remaining bandwidth capacity on the bundle is not greater than or equal to the bandwidth capacity of the link (step 730), then at step 735, the PLR may not protect the link with the backup tunnel over the bundle that shares the risky SRLG. The procedure then ends at step 740.

Figure 8:
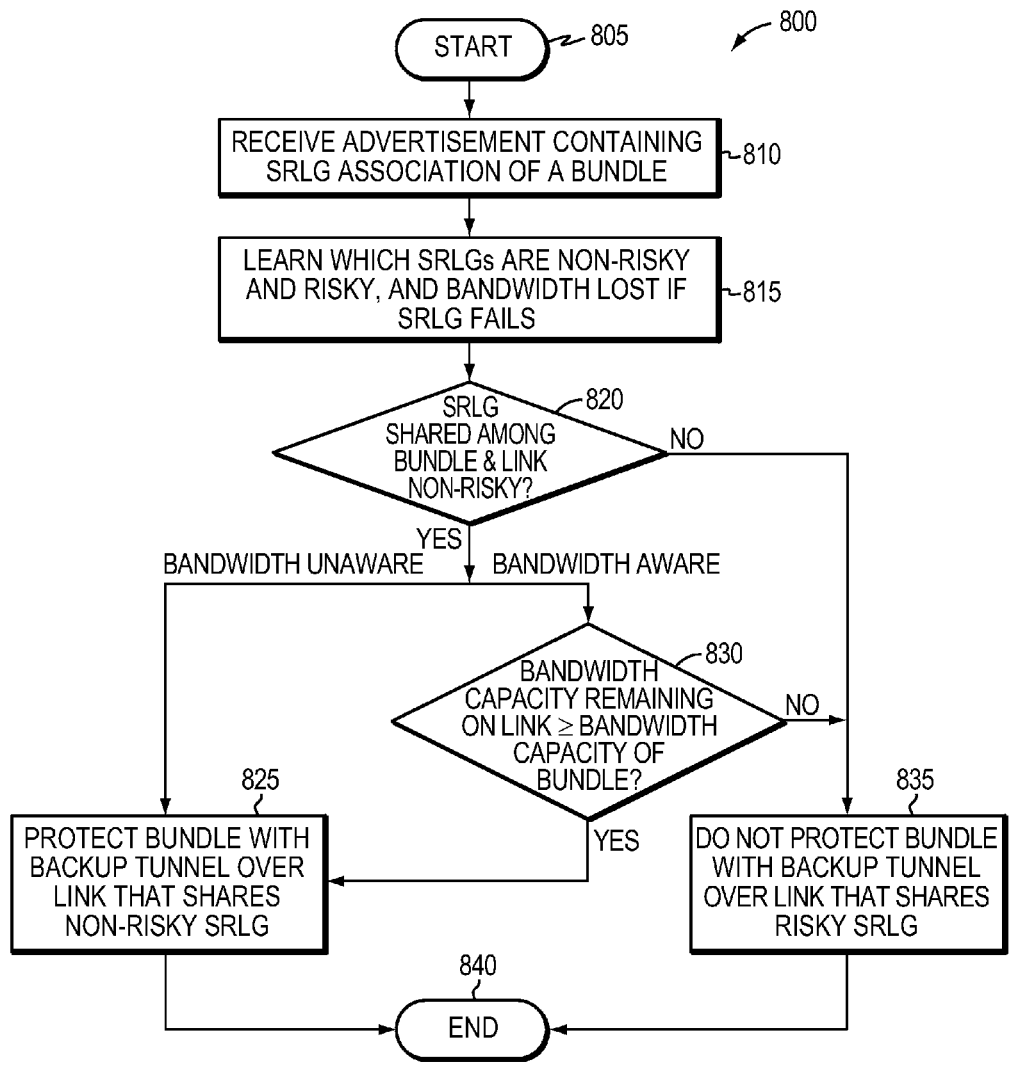
FIG. 8 illustrates an example simplified procedure for protecting a bundle with a backup tunnel over a communication link, where the bundle and link share a SRLG.

FIG. 8 illustrates an example simplified procedure for protecting a bundle with a backup tunnel over a communication link, where the bundle and link share a SRLG. The procedure 800 starts at step 805 and continues to step 810, where a PLR may receive an advertisement containing a SRLG association of a bundle from the network. In step 815, the PLR may analyze the SRLG association to learn which SRLGs are considered "non-risky" and "risky." In addition, the PLR may analyze the association to learn the bandwidth capacity lost if a SRLG of the bundle were to fail or otherwise become inactive. At step 820, the PLR determines whether a SRLG shared amongst the bundle and the link is "non-risky" or "risky." In accordance with the bandwidth unaware embodiments, if the shared SRLG is determined to be a "non-risky" SRLG, then at step 825, the PLR may protect the bundle with a backup tunnel over the link that shares the non-risky SRLG. In accordance with the bandwidth aware embodiments, if the shared SRLG is determined to be a "non-risky" SRLG, then at step 830, the PLR determines whether the remaining bandwidth capacity on the link is greater than or equal to the bandwidth capacity of the bundle. If so, the PLR may protect the bundle with the backup tunnel over the link in step 825. However, if the shared SRLG is determined to be a "risky" SRLG (step 820) or if the remaining bandwidth capacity on the link is not greater than or equal to the bandwidth capacity of the bundle (step 830), then at step 835, the PLR may not protect the bundle with the backup tunnel over the link that shares the risky SRLG. The procedure then ends at step 840.

Advantageously, the embodiments disclosed herein provide methods for distinguishing between risky and non-risky SRLGs on a bundle of communication links in a computer network, while also providing the network and its constituent nodes with information distinguishing the SRLGs in a compact and easily-discernable format that facilitates intelligent and efficient utilization of the information. Specifically, a PLR in the computer network may analyze the SRLG association of the bundle, manifested as a tuple of an advertisement, to optimally place a backup tunnel (path) in the network to protect a link in an efficient manner.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving, at a network node comprising a processor, an advertisement having an association that indicates one or more shared risk link groups (SRLGs) associated with a bundle of member links in a computer network and one or more indicators indicating which SRLGs are risky;
   analyzing the received association to determine whether the bundle of member links and a communication link to be protected share at least one SRLG;
   determining whether the shared at least one SRLG is non-risky; and
   in response to determining that the shared at least one SRLG is non-risky, protecting the communication link with a backup tunnel that includes at least one member link of the bundle.

2. The method of claim 1, further comprising:
   configuring the bundle with a threshold number of active member links needed for the bundle to assume an active state; and
   determining that a selected SRLG associated with the bundle is non-risky in response to inactivity of the selected SRLG satisfying the number of active member links needed for the bundle to assume the active state.

3. The method of claim 2, further comprising:
   determining that the selected SRLG associated with the bundle is risky in response to inactivity of the selected SRLG not satisfying the number of active member links needed for the bundle to assume the active state.

4. The method of claim 1, further comprising:
   configuring the bundle with a minimum bandwidth threshold needed for the bundle to assume an active state; and
   determining that a selected SRLG associated with the bundle is non-risky in response to inactivity of the selected SRLG satisfying the minimum bandwidth threshold needed for the bundle to assume the active state.

5. The method of claim 4, further comprising:
   determining that the selected SRLG associated with the bundle is risky in response to inactivity of the selected SRLG not satisfying the minimum bandwidth threshold for the bundle to assume the active state.

6. The method of claim 1, wherein the association further comprises: one or more additional indicators indicating which SRLGs are non-risky.

7. The method of claim 1, wherein the association embodies a multi-part data structure, wherein a first part identifies each SRLG and a second part contains the one or more indicators.

8. The method of claim 1, wherein protecting the communication link with the backup tunnel further comprises:
   protecting the communication link with the backup tunnel that includes at least one member link of the bundle in response to determining that the shared at least one SRLG is non-risky and in response to a bandwidth capacity associated with the protected link being less than an amount of available bandwidth remaining on the bundle should the shared at least one SRLG become inactive.

9. The method of claim 8, wherein the association embodies a multi-part data structure, wherein a first part identifies each SRLG, a second part contains the one or more indicators and a third part indicates an amount of bandwidth lost from the bundle should a selected SRLG become inactive.

10. An apparatus, comprising:
    one or more network interfaces adapted to communicate data, including an advertisement, over a computer network;
    a processor coupled to the network interfaces and adapted to execute one or more processes; and
    a memory configured to store a process executable by the processor, the process when executed operable to:
    receive the advertisement having an association that indicates one or more shared risk link groups (SRLGs) associated with a bundle of member links in the computer network and one or more indicators indicating which SRLGs are risky,
    analyze the received association to determine whether the bundle of member links and a communication link share at least one SRLG,
    determine whether the shared at least one SRLG is non-risky, and protect the bundle of member links with a backup tunnel over the communication link, in response to the shared at least one SRLG being non-risky.

11. The apparatus of claim 10, wherein the process when executed is further operable to:
configure the bundle with a threshold number of active member links needed for the bundle to assume an active state, and
determine that a selected SRLG associated with the bundle is non-risky in response to inactivity of the selected SRLG satisfying the number of active member links needed for the bundle to assume the active state.

12. The apparatus of claim 11, wherein the process when executed is further operable to:
determine that the selected SRLG associated with the bundle is risky in response to inactivity of the selected SRLG not satisfying the number of active member links needed for the bundle to assume the active state.

13. The apparatus of claim 10, wherein the association further comprises: one or more other indicators indicating which SRLGs of the one or more SRLGS are non-risky.

14. The apparatus of claim 10, wherein the association embodies a multi-part data structure, wherein a first part identifies each SRLG and a second part contains the one or more indicators.

15. The apparatus of claim 10, wherein the process when executed to protect is further operable to:
protect the bundle of member links with the backup tunnel over the communication link in response to a determination that the shared at least one SRLG is non-risky and in response to a bandwidth capacity associated with the bundle of member links being less than an amount of available bandwidth on the communication link.

16. The apparatus of claim 15, wherein the association embodies a multi-part data structure, wherein a first part identifies each SRLG, a second part contains the one or more indicators and a third part indicates an amount of bandwidth lost from the bundle should a selected SRLG become inactive.

17. A tangible, non-transitory, computer-readable media having software encoded thereon, the software when executed by a processor operable to:
receive an advertisement having an association that indicates one or more shared risk link groups (SRLGs) associated with a bundle of member links in a computer network and one or more indicators indicating which SRLGs are risky;
analyze the received association to determine whether the bundle of member links and a communication link to be protected share at least one SRLG;
determine whether the shared at least one SRLG is non-risky; and
protect the communication link with a backup tunnel that includes at least one member link of the bundle, in response to the shared at least one SRLG being non-risky.

18. The tangible, non-transitory, computer-readable media of claim 17, wherein the software when executed is further operable to:
configure the bundle with a threshold number of active member links needed for the bundle to assume an active state; and
determine that a selected SRLG associated with the bundle is non-risky in response to inactivity of the selected SRLG satisfying the number of active member links needed for the bundle to assume the active state.

19. The tangible, non-transitory, computer-readable media of claim 18, wherein the software when executed is further operable to:
determine that the selected SRLG associated with the bundle is risky in response to inactivity of the selected SRLG not satisfying the number of active member links needed for the bundle to assume the active state.

20. The tangible, non-transitory, computer-readable media of claim 17, wherein the software when executed to protect is further operable to:
protect the communication link with the backup tunnel that includes at least one member link of the bundle in response to a determination that the shared at least one SRLG is non-risky and in response to a bandwidth capacity associated with the protected link being less than an amount of available bandwidth remaining on the bundle should the shared at least one SRLG become inactive.

* * * * *